2,935,839

IGNITER COMPOSITIONS

Harold A. Beatty, Grosse Pointe Farms, and Martin E. Gluckstein, Farmington, Mich., assignors to Ethyl Corporation, New York, N.Y., a corporation of Delaware No Drawing. Application February 3, 1958
Serial No. 712,676

4 Claims. (Cl. 60—35.4)

This invention relates to new compositions of matter and more particularly to synergistic igniter compositions.

The need for a chemical igniter in systems such as jet aircraft has long been recognized. When "flame-out" occurs in jet engines, particularly at high altitude, re-ignition of the fuel by conventional spark plugs is extremely difficult due to the low pressure and temperature of the fuel-air mixture. The art has therefore recognized the desirability of using spontaneously flammable chemical compounds for this purpose. One compound which has been proposed for this use is trimethylaluminum. Its degree of flammability is acceptable, but it suffers the disadvantage of a high freezing point (15° C.) which militates against its use at high altitude and its handling and storage in winter climates. Also, it is an expensive chemical. Another compound which has been proposed is triethylaluminum which has the advantage of low freezing point, high heat of combustion and substantially lower cost. Unfortunately, the flammability characteristics of triethylaluminum are such that it does not give rise to a stable flame at air-flow velocities characteristic of those which prevail during jet flight.

It is an object of this invention to provide new compositions of matter. A further object is to provide synergistic igniter compositions. A still further object is to provide new compositions useful in ignition of jet fuel under conditions of flame-out at high altitude. Still another object is to provide a new method of ignition of fuel in jet engines.

The above and other objects are accomplished by providing new compositions of matter which consist of mixtures of triethylaluminum and trimethylaluminum wherein the trimethylaluminum constitutes 5 to 40 percent by weight of the total weight of the composition. It has been found that such compositions are eminently suitable as igniters. Among the advantages are (1) high degree of flammability, approaching that of pure trimethylaluminum, (2) low freezing point, surprisingly far below that of triethylaluminum, (3) high heat of combustion, approaching that of triethylaluminum and (4) lower cost, well below that of trimethylaluminum.

The greatest quantum of improvement over the pure triethylaluminum is achieved by the addition of approximately the first five percent of trimethyaluminum to the triethylaluminum. Successive additions of trimethylaluminum beyond this amount bring about more gradual improvements in flammability. When the amount of trimethylaluminum in the composition is greater than about 20 percent, the further gain in flammability is almost off-set by the cost and other disadvantages inherent in the larger amount of trimethylaluminum used. For greatest depression of freezing point, at least 10 percent of trimethylaluminum should be used. For this reason compositions which consist of mixtures of triethylaluminum and trimethylaluminum wherein the trimethylaluminum constitutes 10 to 20 percent by weight of the total weight of the composition are preferred.

Moreover, it has been discovered that compositions of the type described have a degree of flammability which is synergistic. Thus, as will be developed in more detail later, the highest linear air flow rate which will permit the existence of a stable igniter flame in the test apparatus used is about 200 feet per second for pure trimethylaluminum and about 50 ft./sec. for pure triethylaluminum. Straight line interpolation between these two values leads to a calculated highest air flow for a 5 percent trimethyaluminum-95 percent triethylaluminum mixture of about 58 ft./sec. and for a 20 percent trimethylaluminum-75 percent triethylaluminum mixture of approximately 110 ft./sec. Actual values are much higher than this, approaching 140 ft./sec. for the former mixture and 150 ft./sec. for the latter. Compositions with amounts of trimethylaluminum intermediate between those just mentioned exhibit similar synergistic gains in flammability. When compositions employing substantially more than 40 percent trimethylaluminum are used, the degree of flammability rapidly approaches the calculated value. Therefore, such compositions are markedly less significant than those containing 5 to 40 percent trimethylaluminum.

The present invention also provides a method of igniting fuel in a jet engine. This method comprises introducing into the combustor portion of a jet engine a mixture which consists essentially of triethylaluminum containing 5 to 40 percent by weight of trimethylaluminum and preferably 10 to 20 percent by weight of trimethylaluminum. Thus, in a jet aircraft a tank filled with a composition of this invention, protected with an atmosphere of inert gas, can be mounted with a line leading therefrom connecting to the combustor section of the jet engine proper. The point of connection with the combustor is not critical. It can be fore, aft or collinear with the air and fuel inlet ports. This connecting line is closed by a valve which is controlled by electrical or other means from the cockpit. In an alternate arrangement the valve is actuated automatically. Thus, the valve can be actuated by power means connected to a temperature-sensitive probe device located within the combustor section of the engine. The probe is regulated so as to cause the valve to open momentarily when the temperature in the combustor falls below flame temperature and to close when the flame is re-established. Thus, when flame-out occurs the igniter composition is automatically injected into the combustor until the flame is re-established. In the event of a flame-out with pilot-controlled valve, the pilot actuates the controls to open the valve and emit the trimethylaluminum-triethylaluminum mixture into the combustor section of the engine. The mixture of alkyl aluminums ignites and causes reignition of the jet fuel thereby powering the aircraft.

This method of igniting fuel in a jet engine is applicable to all types of jets, including turbo-jets, ram-jets and pulse jets.

The compositions of this invention are made by simple blending or admixing of the two components thereof. Since these materials are spontaneously flammable in the presence of air, it is necessary to conduct all blending and handling in an inert atmosphere. Nitrogen and rare gases are suitable for this purpose.

The compositions of this invention are clear, colorless, mobile liquids which have extremely low freezing points. All compositions falling within this invention are homogeneous. They react violently with water and decomposition in the presence of air. They are soluble without reaction or decomposition in hydrocarbons.

The following examples illustrate typical compositions of this invention.

*Example I*

Five parts by weight of trimethylaluminum are blended with agitation with 95 parts by weight of triethylaluminum. The blending is conducted under an atmosphere of repurified nitrogen. The resultant composition has a freezing point well below that of pure triethyaluminum.

*Example II*

Using the same technique as in Example I the following compositions are blended:

| Trimethyl-aluminum, percent | Triethyl-aluminum, percent | Freezing Point, °C. |
| --- | --- | --- |
| 9 | 91 | below −76 |
| 20 | 80 | below −76 |
| 30 | 70 | below −76 |
| 40 | 60 | below −76 |

The utility of compositions of this invention as igniter mixtures can be demonstrated by the following procedure.

The apparatus consists of a two-inch pipe, to one end of which is connected a source of air flow. The air is forced through the pipe by means of a water-sealed rotary pump and a small surge chamber capable of operation at 60 p.s.i.g. with a continuous capacity of about 1000 cu. ft. per minute. The end of the pipe opposite the air source is open to permit unhindered exit of exhaust gases. The air flow is measured by means of a Pitot tube located along the axis of the pipe a short distance aft of the air pump. The over-all length of the combustion section of the pipe is 1 to 2.5 feet.

A short distance downstream of the Pitot tube is located an inlet nozzle for injection of trimethylaluminum-triethylaluminum mixtures into the air stream within the pipe. This nozzle is a 60° solid cone-type spray nozzle which is mounted vertically and normal to the axis of the pipe. The nozzle is connected outside the pipe by means of metal tubing to a vessel containing the trimethylaluminum-triethylaluminum mixture. This vessel is protected by an atmosphere of especially purified nitrogen and is connected with a source of pressurized nitrogen such that the mixture can be forced into the pipe by means of nitrogen pressure. The line between the nozzle and chamber tank is closed by a suitable valve.

In operation of this apparatus, air is supplied to the pipe with a stable stream velocity of 100 ft./sec. The valve in the line between the pipe and the igniter vessel is then opened to admit the igniter to the nozzle and thence to the interior of the pipe. The formation of a flame or lack thereof is noted. If a flame appears at 100 ft./sec. air flow, the igniter supply is immediately cut off and the line is purged. The air flow is then increased and the procedure repeated. For those cases where a flame appears at air velocities greater than 150 ft./sec., the air flow is increased with the igniter on in order to determine the blow-off point.

For those runs where no flame appears at an air velocity of 100 ft./sec., the flow rate is decreased below this value until a flame appears and then increased, in order to determine if a flame which ignited below 100 ft./sec. remains stable above 100 ft./sec.

By use of the above technique the following results were obtained. Pure trimethylaluminum provided a stable flame at air flow velocity up to 200 ft./sec. Pure triethylaluminum produced a stable flame (but one which could only be started with difficulty) at an air flow of 50 ft./sec. When the air flow was raised to 90 ft./sec. a stable flame could not be produced with pure triethylaluminum. With a mixture of 90 percent triethylaluminum-10 percent trimethylaluminum a stable flame was produced with air flow velocities as high as 150 ft./sec. and with a 75 percent triethylaluminum-25 percent trimethylaluminum, stable flames were also produced at this velocity of air. These values all lie far above straight-line interpolation between the values for pure triethylaluminum and pure trimethylaluminum.

Similar results are obtained with use of other compositions within the scope of this invention such as 5 percent trimethylaluminum-95 percent triethylaluminum, 12 percent trimethylaluminum-88 percent triethylaluminum, 15 percent trimethylaluminum-85 percent triethylaluminum, 40 percent trimethylaluminum-60 percent triethylaluminum, and the like.

Further additions of trimethylaluminum did not substantially increase the degree of flammability. For example, a 50-50 mixture was stable only up to 160 ft./sec., and flammability in a 25 percent triethylaluminum-75 percent trimethylaluminum mixture was substantially the same.

Moreover, as noted above, as the trimethylaluminum content goes above 40 percent the freezing point of the mixture begins to increase to an undesirable value. For example, the freezing point of a 60 percent trimethylaluminum-40 percent triethylaluminum mixture has risen to −40° C.

We claim:
1. As a new composition of matter a mixture which consists essentially of triethylaluminum containing 5 to 40 percent by weight of trimethylaluminum.
2. As a new composition of matter a mixture which consists essentially of triethylaluminum containing 10 to 20 percent by weight of trimethylaluminum.
3. Method of igniting fuel in a jet engine which comprises introducing into the combustor portion of said engine a mixture which consists essentially of triethylaluminum containing 5 to 40 percent by weight of trimethylaluminum.
4. Method of igniting fuel in a jet engine which comprises introducing into the combustor portion of said engine a mixture which consists essentially of triethylaluminum containing 10 to 20 percent by weight of trimethylaluminum.

References Cited in the file of this patent
UNITED STATES PATENTS
2,867,081   Kimmel _____ Jan. 6, 1959